United States Patent

Holostov et al.

(10) Patent No.: US 9,851,965 B2
(45) Date of Patent: Dec. 26, 2017

(54) STORING OPTIMIZATION FOR CUSTOMIZATION RESOURCES

(71) Applicant: Microsoft Technology Licensing, LLC, Redmond, WA (US)

(72) Inventors: Vladimir Holostov, Sammamish, WA (US); Aaron James Kubly, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/745,318

(22) Filed: Jun. 19, 2015

(65) Prior Publication Data

US 2016/0371078 A1    Dec. 22, 2016

(51) Int. Cl.
| G06F 9/44 | (2006.01) |
| G06F 17/30 | (2006.01) |
| G06F 9/445 | (2006.01) |
| G06F 9/50 | (2006.01) |

(52) U.S. Cl.
CPC ............ G06F 8/70 (2013.01); G06F 9/44505 (2013.01); G06F 9/5011 (2013.01); G06F 17/30117 (2013.01); G06F 17/30138 (2013.01)

(58) Field of Classification Search
None
See application file for complete search history.

(56) References Cited

U.S. PATENT DOCUMENTS

| 6,288,989 | B1 * | 9/2001 | Ro ......................... G11B 19/04 369/47.13 |
| 6,405,362 | B1 | 6/2002 | Shih et al. |
| 6,453,469 | B1 | 9/2002 | Jystad |
| 6,820,214 | B1 | 11/2004 | Cabrera et al. |
| 6,948,166 | B2 | 9/2005 | Barfield et al. |
| 7,257,583 | B2 | 8/2007 | Hofmeister et al. |
| 7,337,359 | B2 | 2/2008 | Lee |
| 7,454,199 | B2 | 11/2008 | Minear et al. |
| 8,583,602 | B2 | 11/2013 | Welingkar et al. |
| 8,745,617 | B1 | 6/2014 | Stekkelpak et al. |

(Continued)

FOREIGN PATENT DOCUMENTS

| KR | 20140028454 A | 3/2014 |
| WO | 2012096951 A2 | 7/2012 |

OTHER PUBLICATIONS

"Installing or Removing Software", Published on: Feb. 13, 2012, Available at: http://doc.opensuse.org/documentation/html/openSUSE_114/opensuse-reference/cha.y2.sw.html.

(Continued)

*Primary Examiner* — Craig Dorais
(74) *Attorney, Agent, or Firm* — Fountainhead Law Group P.C.

(57) ABSTRACT

A facility for managing storage of program customization resources on a computing system is described. The computing system has an amount of storage space, some of which is free. Some of the program customization resources are selected for use. The facility determines that the amount of free storage space is inadequate. In response, the facility identifies at least a portion of the plurality of program customization resources stored on the computing system that are not selected for use, and causes the identified program customization resources to be deleted from the computing system.

21 Claims, 10 Drawing Sheets (56) References Cited

U.S. PATENT DOCUMENTS

| | | |
|---|---|---|
| 2003/0237021 A1 | 12/2003 | Ching et al. |
| 2006/0136446 A1 | 6/2006 | Hughes et al. |
| 2007/0204125 A1 | 8/2007 | Hardy |
| 2007/0243934 A1* | 10/2007 | Little .................... G07F 17/32 463/40 |
| 2011/0307573 A1 | 12/2011 | Lingafelt et al. |
| 2013/0297887 A1 | 11/2013 | Woodward et al. |
| 2013/0326499 A1 | 12/2013 | Mowatt et al. |
| 2014/0279027 A1 | 9/2014 | Chou |
| 2015/0112996 A1* | 4/2015 | Mishra .............. G06F 17/30321 707/741 |

OTHER PUBLICATIONS

"International Search Report and Written Opinion Issued in PCT Application No. PCT/US2016/037126", dated Oct. 25, 2016, 20 Pages.

"International Preliminary Report on Patentability Issued in PCT Application No. PCT/US2016/037126", dated Sep. 8, 2017, 12 Pages.

* cited by examiner

| resource id | size | deletion priority | retrieval priority | |
|---|---|---|---|---|
| 92171686 | 500 k | 50 | 50 | ← 401 |
| 41984929 | 1230 k | 88 | 88 | ← 402 |
| 29186005 | 789 k | 22 | 22 | ← 403 |
| 29699926 | 2 k | 13 | 40 | ← 404 |
| 39243932 | 0 k | 64 | 64 | ← 405 |
| 49534255 | 1423 k | 20 | 20 | ← 406 |
| 45622354 | 983 k | 33 | 33 | ← 407 |
| 81892392 | 942 k | 99 | 99 | ← 408 | customization resource manifest — 400

FIG. 5 customization resource status table — 500

| resource id | present | selected | path or payload | size | deletion priority | retrieval priority |
|---|---|---|---|---|---|---|
| 92171686 | yes | yes | c:/os/res/arctic.wlp | 500 k | 50 | 50 |
| 41984929 | yes | no | c:/os/res/heat_miser.wlp | 1230 k | 88 | 88 |
| 29186005 | yes | no | c:/os/res/qube.wlp | 789 k | 22 | 22 |
| 29699926 | yes | no | c:/os/res/dmsgs.txt | 2 k | 13 | 40 |
| 39243932 | yes | no | color_scheme=old_west | 0 k | 64 | 64 |
| 49534255 | yes | no | c:/os/res/topol.wlp | 1423 k | 20 | 20 |
| 45622354 | yes | yes | c:/os/res/french.lgp | 983 k | 33 | 33 |
| 81892392 | yes | no | c:/os/res/english.lgp | 942 k | 99 | 99 |

511 512 513 514 515 516 517

501 502 503 504 505 506 507 508 customization resource status table — 600

| resource id | present | selected | path or payload | size | deletion priority | retrieval priority |
|---|---|---|---|---|---|---|
| 92171686 | yes | yes | c:/os/res/arctic.wlp | 500 k | | 50 |
| 41984929 | yes | no | c:/os/res/heat_miser.wlp | 1230 k | | 88 |
| 29186005 | no | no | c:/os/res/qube.wlp | 789 k | | 22 |
| 29699926 | no | no | c:/os/res/dmsgs.txt | 2 k | | 40 |
| 39243932 | yes | no | color_scheme=old_west | 0 k | | 64 |
| 49534255 | no | no | c:/os/res/topol.wlp | 1423 k | | 20 |
| 45622354 | yes | yes | c:/os/res/french.lgp | 983 k | | 33 |
| 81892392 | yes | no | c:/os/res/english.lgp | 942 k | | 99 |

601 602 603 604 605 606 607 608
611 612 613 614 615 616 617

*FIG. 6* customization resource status table

| resource id | present | selected | path or payload | size | deletion priority | retrieval priority | |
|---|---|---|---|---|---|---|---|
| 92171686 | yes | yes | c:/os/res/arctic.wlp | 500 k | 50 | 50 | 701 |
| 41984929 | yes | no | c:/os/res/heat_miser.wlp | 1230 k | 88 | 88 | 702 |
| 29186005 | yes | no | c:/os/res/qube.wlp | 789 k | 22 | 22 | 703 |
| 29699926 | yes | no | c:/os/res/dmsgs.txt | 2 k | 13 | 40 | 704 |
| 39243932 | yes | no | color_scheme=old_west | 0 k | 64 | 64 | 705 |
| 49534255 | no | no | c:/os/res/topol.wlp | 1423 k | 20 | 20 | 706 |
| 45622354 | yes | yes | c:/os/res/french.lgp | 983 k | 33 | 33 | 707 |
| 81892392 | yes | no | c:/os/res/english.lgp | 942 k | 99 | 99 | 708 |
| 711 | 712 | 713 | 714 | 715 | 716 | 717 | |

*FIG. 7*

FIG. 8 customization resource status table ─ 900

| resource id | present | selected | path or payload | size | deletion priority | retrieval priority |
|---|---|---|---|---|---|---|
| 92171686 | yes | yes | c:/os/res/arctic.wlp | 500 k | | 50 |
| 41984929 | yes | no | c:/os/res/heat_miser.wlp | 1230 k | | 88 |
| 29186005 | yes | no | c:/os/res/qube.wlp | 789 k | | 22 |
| 29699926 | yes | no | c:/os/res/dmsgs.txt | 2 k | | 13 |
| 39243932 | yes | no | color_scheme=old_west | 0 k | | 64 |
| 49534255 | no | no | c:/os/res/topol.wlp | 1423 k | | 20 |
| 45622354 | yes | no | c:/os/res/french.lgp | 983 k | | 33 |
| 81892392 | yes | yes | c:/os/res/english.lgp | 942 k | | 99 |

STORING OPTIMIZATION FOR CUSTOMIZATION RESOURCES

BACKGROUND

Operating systems and other programs are often customized to use particular resources in response to the needs, preferences, and/or characteristics of each user. For example, on many mobile phones, the operating system can be customized to display messages in the most prevalent natural language in the user's geographic location or the user's preferred natural language, and can be customized to use color schemes associated with a mobile carrier used by the user. Such customization involves selection for use among customization resources of a wide variety of types, including language packs, wallpapers, applications, etc.

In order to make a wide variety of resources available for selection by a user or on a user's behalf, such operating systems and other programs are typically shipped with a full complement of such resources.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for managing storage of program customization resources on a computing system is described. In various examples, these program customization resources include resources for customizing programs such as operating systems, computer firmware, applications, utilities, drivers, etc., such as hardware settings, bios settings, operating system settings, application settings, etc. The computing system has an amount of storage space, some of which is free. Some of the program customization resources are selected for use. The facility determines that the amount of free storage space is inadequate. In response, the facility identifies at least a portion of the plurality of program customization resources stored on the computing system that are not selected for use, and causes the identified program customization resources to be deleted from the computing system.

DETAILED DESCRIPTION

Applicants have identified significant disadvantages with conventional approaches to resource customization. In particular, by including and indefinitely maintaining a full complement of customization resources, the operating system or other program consumes a significant amount of storage space on the device on which it is installed, precluding the use of this space for other purposes that would be useful to the device's user, such as installing additional programs, storing a larger quantity of photos or other data, etc.

In order to overcome these disadvantages, the inventors have conceived and reduced to practice a software and/or hardware facility for optimizing the storage on a device of customization resources for an operating system or other subject program ("the facility"). While there is adequate storage space on the device, the facility maintains a full complement of customization resources. The facility causes to be included in reports of free space presented to the user the space on the device occupied by customization resources that are not currently selected for use. The facility monitors the actual free space available on the device, and dynamically deletes unselected customization resources in order to provide space needed by the user for other purposes.

In some examples, the facility maintains a prioritization of customization resources that it uses to determine an order for deleting the customization resources not selected. In some examples, after deleting customization resources, if and when additional actual free space becomes available—such as when the user deletes or moves data, uninstalls programs, etc.—the facility retrieves deleted customization resources from an external source, such as from a cloud server. In some examples, the facility maintains a prioritization of customization resources that it uses to determine an order for restoring deleted customization resources.

In some examples, the facility coordinates its use of storage space and/or data retrieval capacity with other programs designed to download data, such as program update managers, content retrieval managers for content types such as podcasts, news, and music; etc. In some such examples, the facility subordinates itself to the use of storage space and/or data retrieval capacity by these other programs, in order to minimize its negative impact on user experience.

In some examples, the facility periodically retrieves current versions of a customization resource manifest that lists a currently-approved set of customization resources and assigns one or more kinds of prioritization to them. In some examples, a new version of the customization resource manifest can identify resources that, while now available for download, were not originally shipped with the subject program, and may not have existed at the time the subject program was shipped.

In some examples, the customization resource manifest is tailored to the device, the user, the geographic location in which the device is being used, a service provider such as a wireless carrier with which the device it is being used, etc. In some such examples, the customization resource manifest is tailored based upon customization resources selected by or for users of other devices sharing the above characteristics with the user of the device.

In some examples, the device ships with no customization resources, or a limited set of customization resources, and the facility operates to download a manifest and a current set of applicable customization resources early in the operation of the device.

By behaving in some or all of the ways described above, the facility seeks to make a robust set of customization resources available for immediate selection while avoiding negative impacts on other aspects of user experience. In some examples, the facility permits the device to operate acceptably with a smaller total storage capacity than it would otherwise require.

Figure 1:
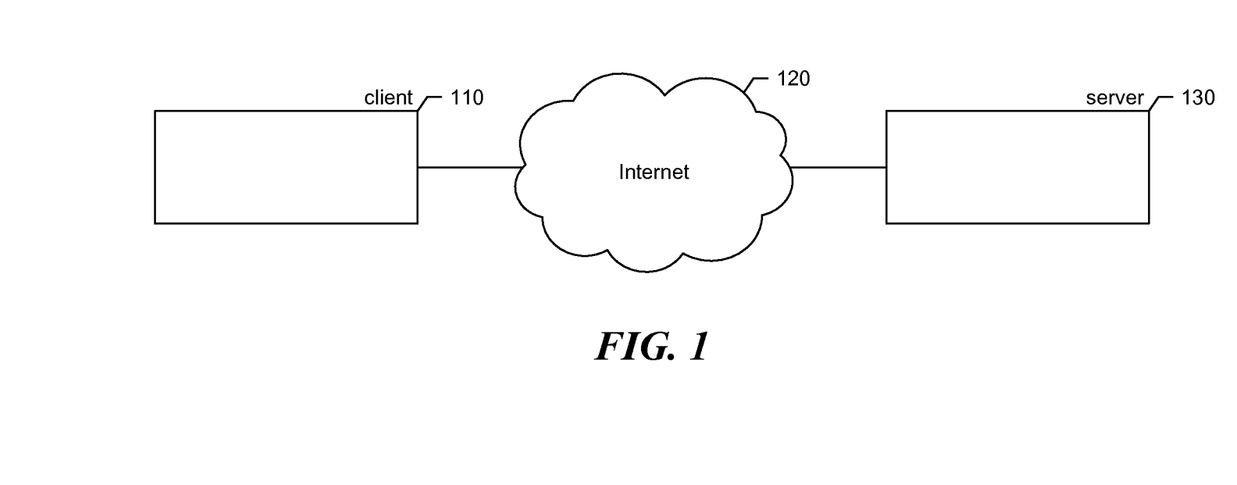
FIG. 1 is a network diagram showing an environment in which the facility operates in some examples.

FIG. 1 is a network diagram showing an environment in which the facility operates in some examples. On a client device 110 is installed the operating system or other subject program whose customization resources are managed by the facility. The client communicates via the Internet 120 or another network with a server 130, such as a server located in a data center. The client retrieves from the server customization resources needed in the client but not present in the client, such as customization resources that have been deleted from the client by the facility, or customization resources never present in the client. In some examples, the client also periodically retrieves from the server customization resource manifests listing customization sources that are available for the subject program, as well as relative priority for these resources for deleting and/or retrieving them.

While various examples are described in terms of the environment described above, those skilled in the art will appreciate that the facility may be implemented in a variety of other environments including a single, monolithic computer system, as well as various other combinations of computer systems or similar devices connected in various ways. In various examples, a variety of computing systems or other different client devices may be used in place of the web client computer systems, such as mobile phones, personal digital assistants, televisions, cameras, etc.

Figure 2:
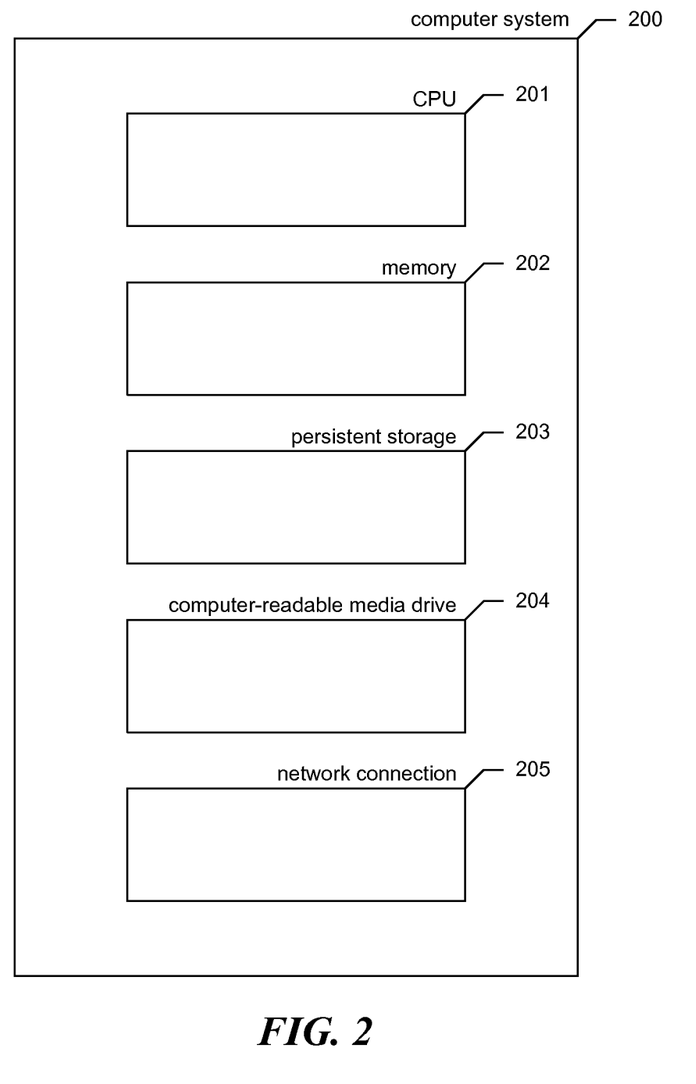
FIG. 2 is a block diagram showing some of the components typically incorporated in at least some of the computer systems and other devices on which the facility operates in some examples.

FIG. 2 is a block diagram showing some of the components typically incorporated in at least some of the computer systems and other devices on which the facility operates in some examples. In various examples, these computer systems and other devices 200 can include server computer systems, desktop computer systems, laptop computer systems, netbooks, mobile phones, personal digital assistants, televisions, cameras, automobile computers, electronic media players, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
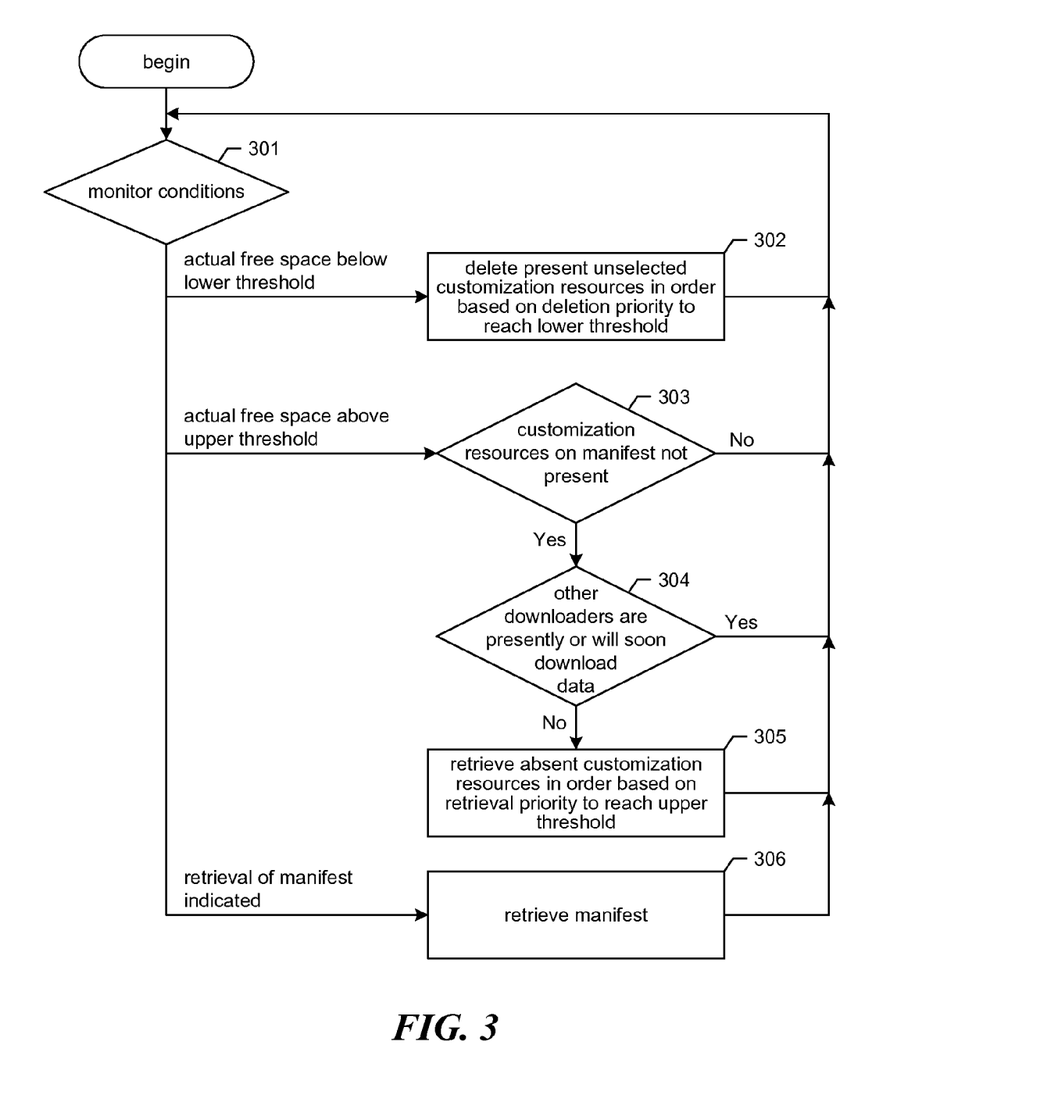
FIG. 3 is a flow diagram showing example acts that may be performed by the facility in some examples to manage customization resources for the subject program.

FIG. 3 is a flow diagram showing example acts that may be performed by the facility in some examples to manage customization resources for the subject program. In various examples, the facility performs these acts continuously or periodically. At 301, the facility monitors for each of a number of conditions on which it acts: if the actual amount of free space available on the device falls below a lower threshold, then the facility continues at 302; if the actual free space on the device exceeds an upper threshold, then the facility continues at 303; if the retrieval of a current version of the customization resource manifest is indicated, then the facility continues at 306.

At 302, where the amount of actual free space on the device falls below a lower threshold, the facility deletes unselected customization resources in an order that is based upon deletion priorities attributed to the customization resources until the amount of actual free space on the device is no longer below the lower threshold. After 302, the facility continues at 301 to resume monitoring monitored conditions. In various examples, the facility uses various lower threshold values below which it deletes customization resources, including such threshold values as one megabyte, two megabytes, 5 megabytes, 1 percent of the device's total storage capacity, 2 percent of the device's total storage capacity, 5 percent of the device's total storage capacity, etc. In some examples (not shown), rather than or in addition to monitoring the total amount of actual free space, the facility monitors for file system operations, such as file writes, that consume storage capacity and are about to fail for inadequate free space. Rather than permitting such operations to fail, the facility suspends the operation, performs the deletion shown at 302, then resumes the file system operation so that it can complete successfully.

Figure 4:
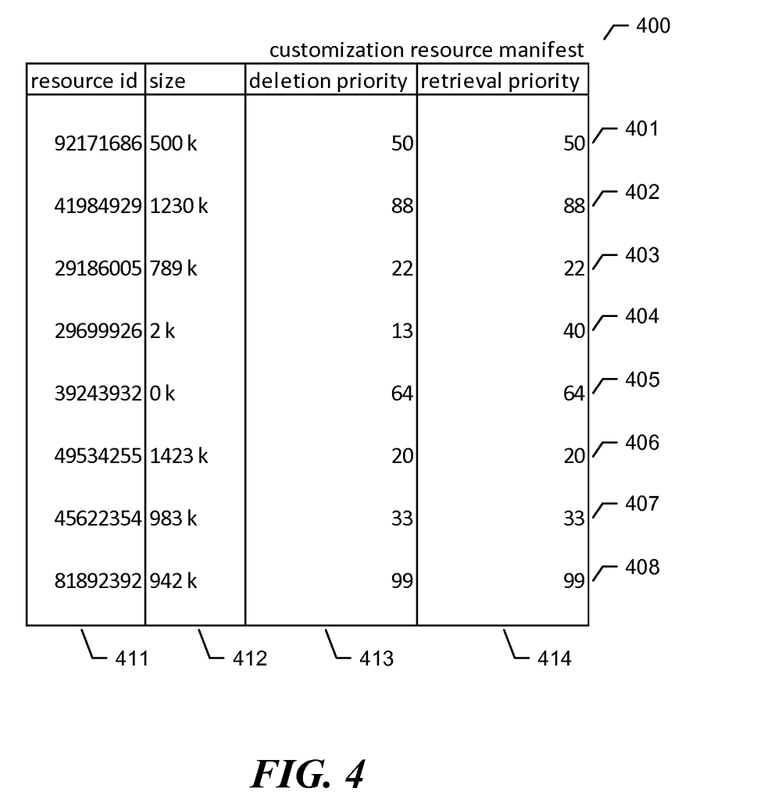
FIG. 4 is a table diagram showing sample contents of a customization resource manifest used by the facility in some examples to identify customization resources available for the subject program and their relative priorities.
Figure 5:
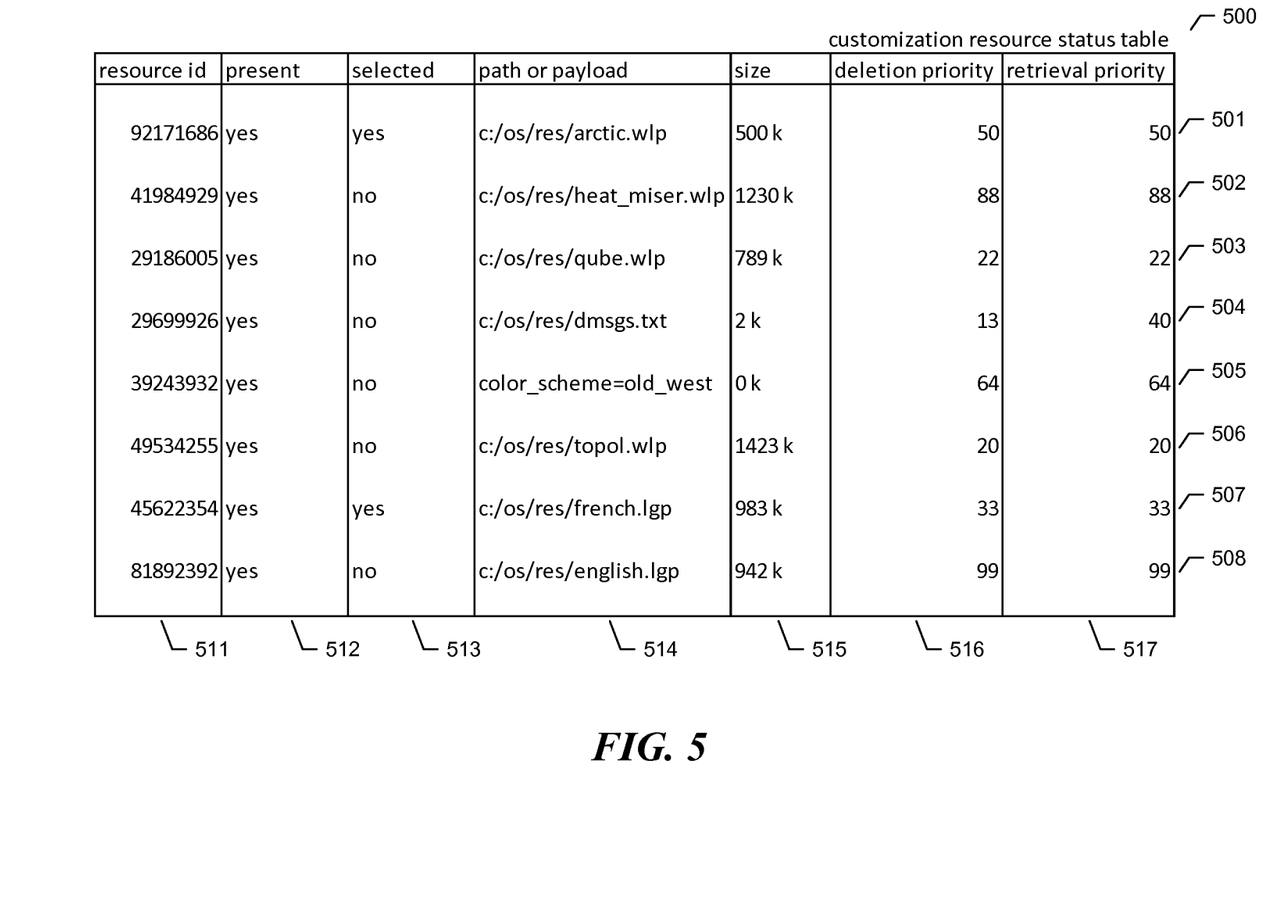
FIG. 5 is a table diagram showing sample contents of a customization resource status table used by the facility in some examples to track the status of different customization resources maintained by the facility.
Figure 6:
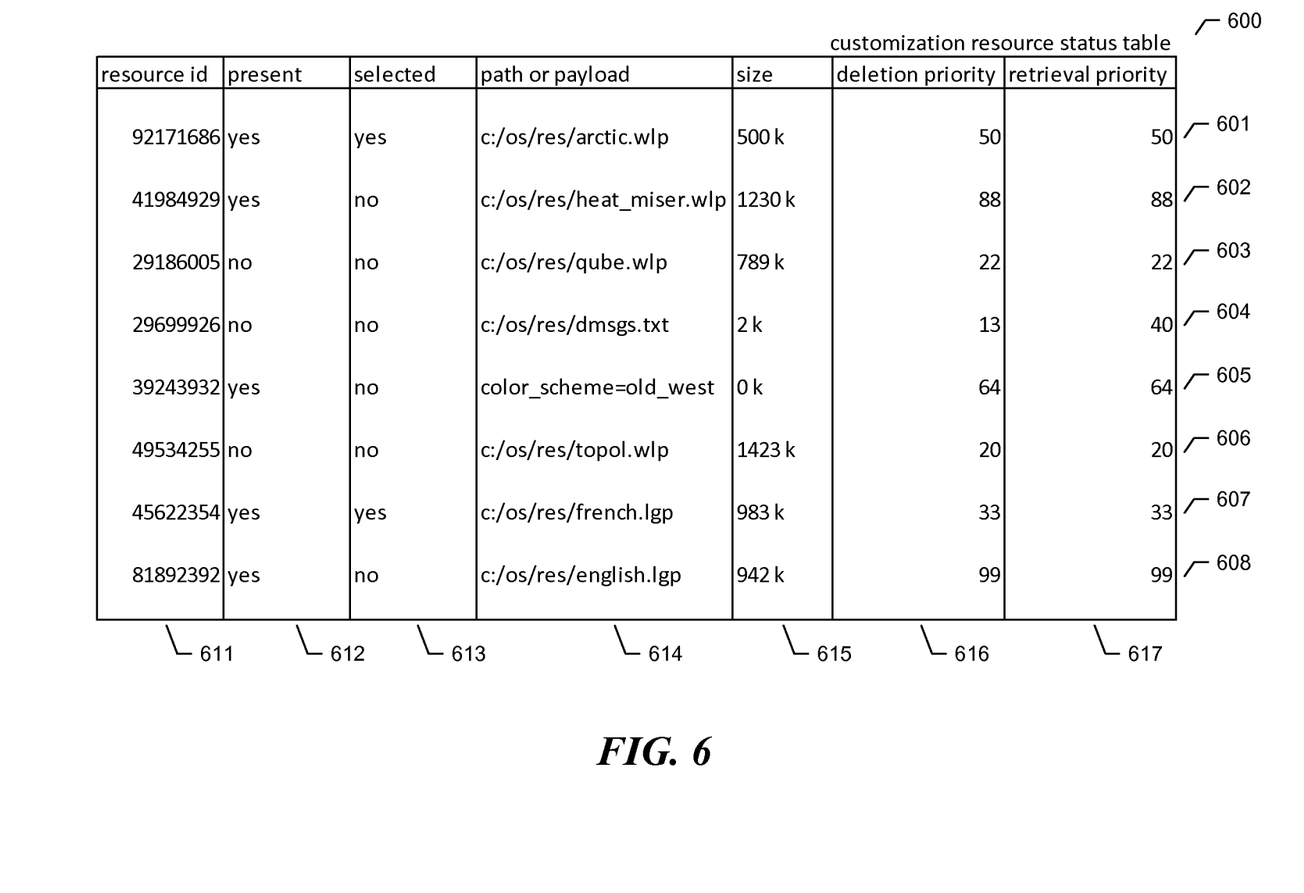
FIG. 6 is a table diagram showing sample contents of the customization resource status table after the deletion of resources to reclaim storage space.

FIGS. 4-6 illustrate the deletion of customization resources at 302. FIG. 4 is a table diagram showing sample contents of a customization resource manifest used by the facility in some examples to identify customization resources available for the subject program and their relative priorities. The customization resource manifest table 400 is made up of rows, such as rows 401-408, each corresponding to a different customization resource. Each of these rows is divided into the following columns: a resource id column 411 uniquely identifying the resource; a size column 412 indicating the size of the resource, i.e., the amount of storage space occupied by the resource; a deletion priority column 413 showing a deletion priority for the resource reflecting how important it is to maintain the resource when resources are being deleted from the device, i.e., the facility deletes resources in order of increasing deletion priority; and a retrieval priority column 414 containing a retrieval priority indicating how important it is to retrieve the resource when it is not present on the device and the device has adequate room to retrieve additional resources, i.e., resources are retrieved in decreasing order of retrieval priority. For example, row 401 indicates that the resource having resource ID 92171686 has size 500 k, deletion priority of 50, and retrieval priority of 50.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

FIG. 5 is a table diagram showing sample contents of a customization resource status table used by the facility in some examples to track the status of different customization resources maintained by the facility. The customization resource status table 500 is made up of rows, such as rows 501-508, each corresponding to a different customization resource that is available for the subject program. Each of the rows is divided into the following columns: a resource id column 511 containing a resource id uniquely identifying the resource; a present column 512 indicating whether or not the resource is currently stored on the device; a selected column 502 indicating whether the resource is presently being used by the subject program; a path or payload column 514 containing either a path to where the resource is stored in the file system, or, for small resources, the actual payload—or contents—of the resource; a size column 515 showing the amount of space occupied by the resource; a deletion priority column 516 showing the resource's deletion priority; and a retrieval priority column 517 showing the resource's retrieval priority. In some examples, the facility copies the contents of the resource id, size, deletion priority, and retrieval priority columns from the customization resource manifest. As one example, row 501 indicates that the resource having resource id 92171686 is stored on the device; is selected by the subject program; is stored at file system path c:/os/res/arctic.wlp; has size 500 k; has deletion priority 50; and has retrieval priority 50. Row 505, rather than containing a path, contains a payload for a small resource: "color_scheme=old_west."

As one example, the facility determines that, at a time when the customization resource status table has the contents shown in FIG. 5, the amount of actual free space has fallen 2200 k below the lower threshold. In response, it selects resources shown in FIG. 5 for deletion. As a first matter, the facility begins with rows of FIG. 5 containing "yes" in the present column, as these are the only resources consuming space on the device. The facility finds that all of rows 501-508 contain "yes" in the present column. The facility then filters out resources containing "yes" in the selected column, as these resources are in use and not available for deletion: rows 501 and 507. The facility then traverses the remaining rows in increasing order of deletion priority, selecting these resources for deletion until at least 2200 k of resources have been deleted: row 504, then row 506, then row 503. The facility then deletes the resources to which these three rows correspond, thus restoring the amount of actual free space to above the lower threshold.

FIG. 6 is a table diagram showing sample contents of the customization resource status table after the deletion of resources to reclaim storage space. It can be seen by comparing FIG. 6 to FIG. 5 that the resources to which rows 603, 604, and 606 refer are now marked as not present. Once additional storage space becomes available on the device, the facility will consider these resources for retrieval from the server.

Returning to FIG. 3, at 303, where the amount of actual free space has risen above the facility's upper threshold, if any customization resources on the manifest are identified by the customization resource status table as not present, then the facility continues at 304, else the facility continues at 303. In various examples, the facility uses various values of its upper threshold, such as 100 Mb, 500 Mb, 1 Gb, 5% of the total storage capacity of the device, 10% of the total storage capacity of the device, 20% of the total storage capacity of the device, etc. At 304, if other programs that download data are presently downloading data or will soon, then the facility continues at 301, else the facility continues at 305. At 305, the facility retrieves absent customization resources in an order that is based on their retrieval priorities to reach the facility's upper threshold.

To extend the example, when the customization resource status table is in the state shown in FIG. 6, the facility determines that the amount of actual free space exceeds its upper threshold by 790 k. To select the resources to retrieve, the facility begins with those containing "no" in the present column: rows 603, 604, and 606. The facility then selects these resources in decreasing order of their retrieval priority—row 604, then row 603. After selecting more than 790 k of resources (791 k), the facility proceeds to download these two selected resources.

Figure 7:
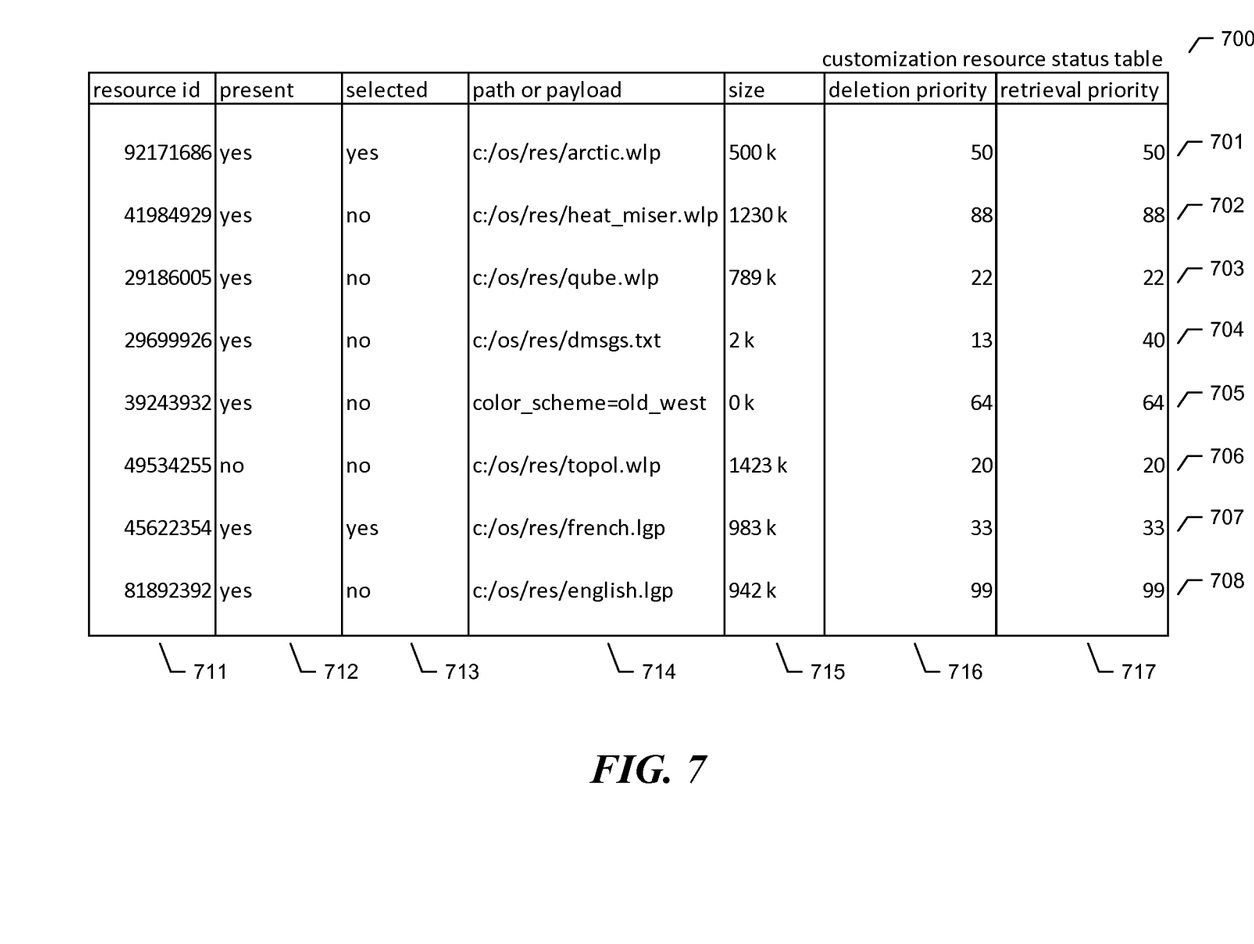
FIG. 7 is a table diagram showing sample contents of the customization resource status table updated to reflect the download of previously deleted resources.

FIG. 7 is a table diagram showing sample contents of the customization resource status table updated to reflect the download of previously deleted resources. It can be seen by comparing FIG. 7 to FIG. 6 that rows 703 and 704 now have "yes" in the present column.

Returning to FIG. 3, at 306 where retrieval of the manifest is indicated, such as due to the passage of a certain amount of time, such as 1 day, 7 days, 30 days, etc., the facility retrieves the manifest. In some examples, after doing so, the facility compares the manifest to the customization resource status table, and updates the customization resource status table to reflect changes in the manifest, such as the addition of new rows, the change of a resource's priority, etc.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

Figure 8:
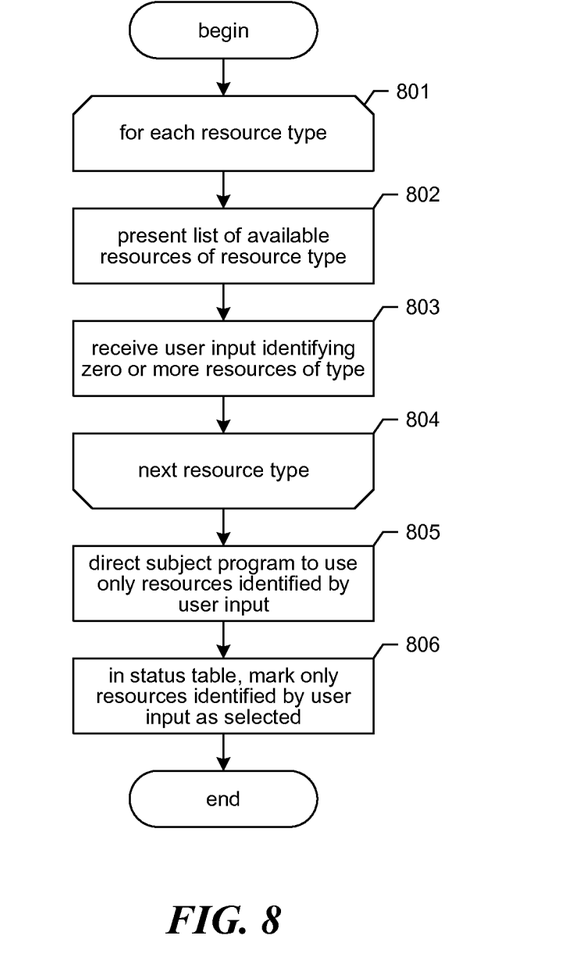
FIG. 8 is a flow diagram showing example acts that may be performed by the facility in some examples to perform re-customization of the subject program.

FIG. 8 is a flow diagram showing example acts that may be performed by the facility in some examples to perform re-customization of the subject program. The facility repeats acts 801-804 for each resource type, e.g., once for language packs, once for wallpapers, once for applications, etc. At 802, the facility presents to the user a list of available resources of the current resource type. In some examples, the facility includes in the list customization resources not currently present on the device, but which the facility can download from the server, such as customization resources listed in the customization resource manifest. In some examples, the facility performs selection of customization resources of some or all of the resource types automatically based upon a variety of attributes of the device, including, for example, device type, operating system version, wireless carrier identity, a geographic location associated with the device, etc. In some such examples, the facility omits to present to the user a list of available resources of these types. In some such embodiments, the facility presents to the user a list of available resources of these types, indicates a preliminary automatic selection of some of them, and permits the user to alter the preliminary automatic selections if desired. At 803, the facility receives user input selecting any number of the resources of the current type. At 804, if additional resource types remain to be processed, then the facility continues at 801 to process the next resource type, else the facility continues at 805. At 805, the facility directs the subject program to use only the resources selected by the user input received in step 803. At 806, in the customization resource status table, the facility marks as selected only those resources selected by the user input received in step 503. If a resource was formerly marked as selected but was not identified by the user input received in step 803, then the facility marks the resource as not selected. After 806, these acts conclude. After the facility performs this process, only the customization resources identified by the user are exempt from deletion by the facility.

Figure 9:
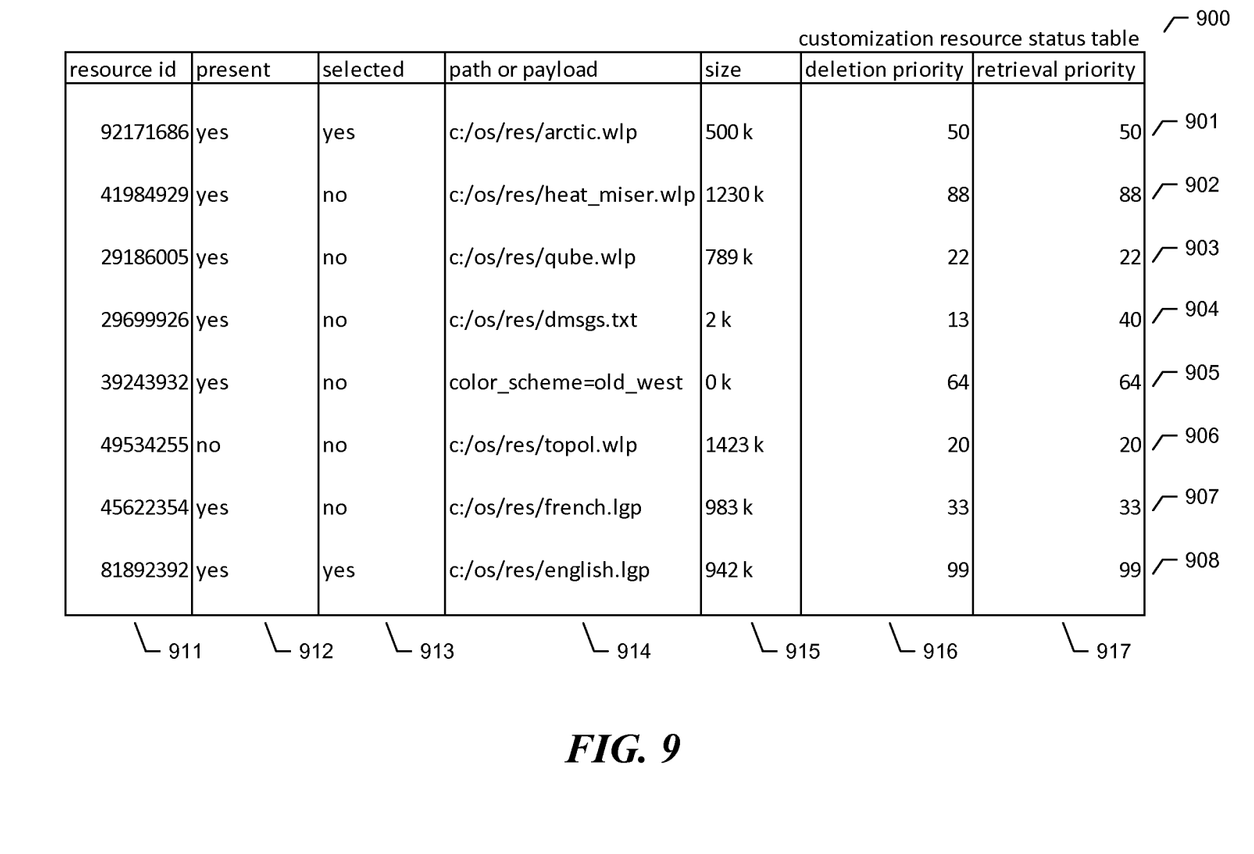
FIG. 9 is a table diagram showing sample contents of the customization resource status table that reflect re-customization of the subject program.

FIG. 9 is a table diagram showing sample contents of the customization resource status table that reflect re-customization of the subject program. By comparing FIG. 9 to FIG. 7, it can be seen that, while the user has again selected the resource to which row 901 corresponds, the user has selected the resource to which row 908 corresponds to the exclusion of the resource to which row 907 corresponds. Accordingly, the resource to which row 907 corresponds is now available for deletion, while the resource to which row 908 corresponds is no longer available for deletion.

Figure 10:
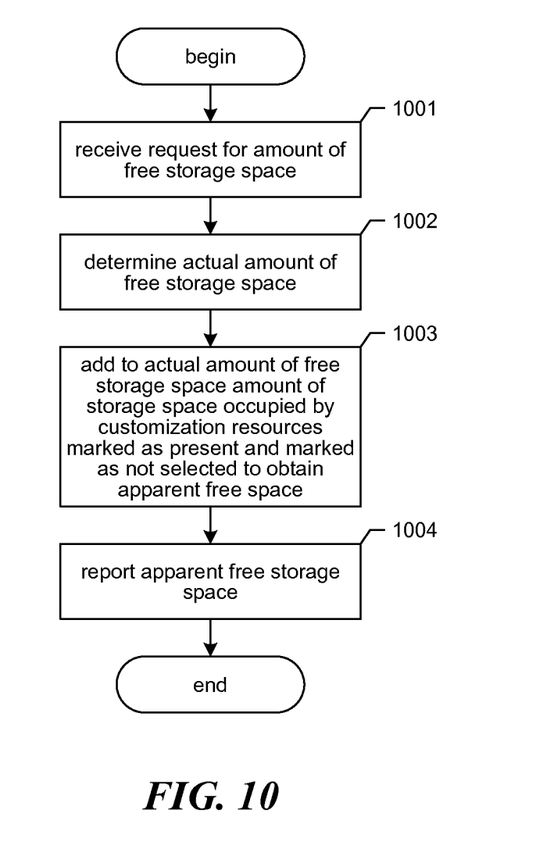
FIG. 10 is a flow diagram showing examples acts that may be performed by the facility in order to report an amount of free storage space available on the device to the user.

FIG. 10 is a flow diagram showing examples acts that may be performed by the facility in order to report an amount of free storage space available on the device to the user. At 1001, the facility receives a request for the amount of free storage space for display to the user. At 1002, the facility determines the actual amount of free storage space that is available. At 1003, the facility adds to the actual amount of free storage space determined at 1002 the amount of storage space occupied by customization resources marked in the customization resource status table as present and marked in the customization resource status table as not selected to obtain an apparent amount of free storage space. At 1004, the facility reports the amount of apparent free storage space determined at 1003 to the user, such as by displaying it on the device, returning it to a calling program that will display it on the device, etc. After 1004, these acts conclude.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A computer system for managing storage of a plurality of program customization resources available for a subject program, comprising:
   a storage device configured to store:
      first data constituting a plurality of program customization resources;
      second data, the second data tracking, among a multiplicity of program customization resources that includes the plurality of program customization resources:
         those program customization resources that are among the plurality of program customization resources; and
         those program customization resources that are selected for use by the subject program; and
      third data distinct from both the first data and the second data, the storage device having a space utilization level reflecting the amount of space consumed on the storage device by the first data, the second data, and the third data, collectively; and
   a storage management subsystem configured to:
      selectively shift program customization resources of the multiplicity of program customization resources into and out of the plurality of program customization resources in order to maintain the space utilization level of the storage device within a selected range, in such a way that program customization resources only are eligible to be shifted out of the plurality of program customization resources by the storage management subsystem if the tracking data indicates that the program customization resources are not selected for use by the subject program;
      determine whether the space utilization level of the storage device is outside of the selected range; and
      based at least on a determination that the space utilization level of the storage device is outside of a selected range, shift at least one of the shifted-out program customization resources of the multiplicity of program customization resources into the plurality of program customization resources.

2. The computer system of claim 1, further comprising:
   a communication device configured to receive, from a server, those program customization resources of the multiplicity of program customization resources that have been shifted into the plurality of program customization resources.

3. The computer system of claim 1 wherein each of the plurality of program customization resources has a size, the computer system further comprising:
   a storage space utilization reporting subsystem configured to report a representation of the storage device's space utilization level that is increased by at least a portion of a collective size of program customization resources among the plurality of program customization resources that are not selected for use by the subject program.

4. A computer-readable medium having contents configured to cause a computing system having an amount of storage space, some of which is free, to, in order to manage storage of a plurality of program customization resources on the computing system, some of which are selected for use:
   determine whether the amount of free storage space is adequate;
   at a first time, based at least on a determination that the amount of free storage space is inadequate:
      identify at least a portion of the plurality of program customization resources stored on the computing system that are not selected for use; and
      cause the identified program customization resources to be deleted from the computing system;
   determine whether the amount of free storage space exceeds a threshold;
   at a second time later than the first time, based at least on a determination that the amount of free storage space exceeds the threshold:
      cause at least one of the deleted program customization resources to be copied to the computing system.

5. The computer-readable medium of claim 4 wherein the contents of the computer-readable medium are configured to cause the computing system to determine that the amount of free storage space is inadequate by detecting that the amount of free storage space is below a threshold level.

6. The computer-readable medium of claim 4 wherein the contents of the computer-readable medium are configured to cause the computing system to determine that the amount of free storage space is inadequate by detecting that a file system operation has been requested whose successful completion requires more storage space than the amount of free storage space.

7. The computer-readable medium of claim 4 wherein the contents of the computer-readable medium are configured to further cause the computing system to access priority scores for the plurality of program customization resources stored on the computing system, and wherein the identification is performed based at least on the accessed priority scores.

8. The computer-readable medium of claim 7 wherein the contents of the computer-readable medium are configured to further cause the computing system to download the accessed priority scores from a server.

9. The computer-readable medium of claim 7 wherein the accessed priority scores have been adjusted based upon at least one characteristic of the computing system.

10. The computer-readable medium of claim 7 wherein the accessed priority scores have been adjusted based upon at least one characteristic of a user of the computing system.

11. The computer-readable medium of claim 8 wherein the accessed priority scores downloaded from the server are priority scores determined based upon the selection of configuration resources for use with the subject program on other computing systems.

12. The computer-readable medium of claim 4 wherein the contents of the computer-readable medium are configured to further cause the computing system to access priority scores for the plurality of program customization resources stored on the computing system, and wherein the deleted program customization resources that are caused to be stored on the computing system are chosen based at least on the accessed priority scores.

13. The computer-readable medium of claim 4 wherein the contents of the computer-readable medium are configured to further cause the computing system to:

identify a program executing on the computing system that has scheduled downloading of content to the computing system; and in response to identifying the program, selecting a time at which to cause the deleted program customization resources to be stored on the computing system that is coordinated with the identified program's content downloading schedule.

14. A computer-readable medium storing a program customization resource status table data structure for a subject program installed on a subject computer system, the data structure comprising:

a plurality of entries each corresponding to a program customization resource that is available for the subject program, each entry comprising:

first information identifying the program customization resource to which the entry corresponds;

second information indicating whether the program customization resource to which the entry corresponds is stored on the subject computer system; and third information indicating whether the program customization resource to which the entry corresponds is selected for use with the subject program on the subject computer system, such that the contents of the data structure are usable to:

identify program customization resources stored on the subject computer system that can be deleted at a first time in order to free storage space on the subject computer system, identify program customization resources not stored on the subject computer system that can be downloaded and stored on the subject computer system while adequate free storage space is available, determine whether an amount of free storage space exceeds a threshold, at a second time later than the first time cause at least one deleted program customization resource to be copied to the subject computer system based at least on a determination that the amount of free storage space exceeds the threshold.

15. The computer-readable medium of claim 14 wherein each entry further comprises fourth information indicating an amount of space occupied by the program customization resource to which the entry corresponds.

16. The computer-readable medium of claim 14 wherein each entry further comprises fourth information adequate for deleting the program customization resource to which the entry corresponds.

17. The computer-readable medium of claim 14 wherein each entry further comprises fourth information indicating a relative priority for deleting the program customization resource to which the entry corresponds.

18. The computer-readable medium of claim 14 wherein each entry further comprises fourth information indicating a relative priority for downloading the program customization resource to which the entry corresponds.

19. The computer-readable medium of claim 14 wherein each entry further comprises fourth information adequate for downloading the program customization resource to which the entry corresponds.

20. The computer-readable medium of claim 14 wherein at least one of the entries identifies a program customization resource that has never been stored on the subject computer system.

21. The computer-readable medium of claim 4 wherein the contents of the computer-readable medium are configured to further cause the computing system to:

access deletion priority scores for the plurality of program customization resources stored on the computing system; and access retrieval priority scores, different than the first priority scores, for the plurality of program customization resources stored on the computing system, wherein:

the program customization resources that are caused to be deleted from the computing system are deleted based at least on the accessed deletion priority scores, and the deleted program customization resources that are caused to be stored on the computing system are chosen based at least on the accessed retrieval priority scores.

* * * * *